United States Patent
Weissman et al.

(10) Patent No.: US 11,797,394 B1
(45) Date of Patent: Oct. 24, 2023

(54) SNAPSHOT RESTORE

(71) Applicant: VAST DATA LTD., Tel Aviv (IL)

(72) Inventors: Asaf Weissman, Tel Aviv (IL); Avi Goren, Tel Aviv (IL); Ori Mamluk, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/804,593

(22) Filed: May 30, 2022

(51) Int. Cl.
*G06F 16/11* (2019.01)
*G06F 11/14* (2006.01)

(52) U.S. Cl.
CPC ...... *G06F 11/1469* (2013.01); *G06F 2201/84* (2013.01)

(58) Field of Classification Search
CPC .......... G06F 11/1469; G06F 2201/84
See application file for complete search history.

(56) References Cited

U.S. PATENT DOCUMENTS

| | | | | |
|---|---|---|---|---|
| 6,016,553 | A * | 1/2000 | Schneider | G06F 11/1471 714/21 |
| 10,262,004 | B2 * | 4/2019 | Bellur | G06F 16/182 |
| 2016/0110408 | A1 * | 4/2016 | Madhavarapu | G06F 16/2358 707/615 |
| 2017/0235652 | A1 * | 8/2017 | Natanzon | G06F 11/1453 714/6.3 |
| 2021/0389883 | A1 * | 12/2021 | Derryberry | G06F 3/0659 |
| 2022/0091743 | A1 * | 3/2022 | Chang | G06F 11/1469 |

* cited by examiner

*Primary Examiner* — Merilyn P Nguyen
(74) *Attorney, Agent, or Firm* — Reches Patents

(57) ABSTRACT

A method for retrieving a file system entity at a presence of snapshot restore in a history of the file system entity, the method may include (i) receiving a request to obtain a content of the file system entity (FSE) at a certain point in time (PIT); and (ii) retrieving the content of the FSE at the certain point in time, wherein the retrieving comprises searching for FSE content segments to be included in a response to the request, wherein each FSE content segment has a write time that does not exceed the certain PIT, each FSE content segment is not included in a relevant blind period of time that is associated with a reversible snapshot restore operation, and fulfills another timing criterion.

11 Claims, 7 Drawing Sheets

| Version being requested by an access request | Content viewed for file 101 | Content viewed for file 102 |
|---|---|---|
| 10 | 5 | 5 |
| 20 | 5 | 15 |
| 29 | 25 | 25 |
| 31 | 5 | 5 |
| 40 | 35 | 5 |
| 49 | 45 | 45 |
| 51 | 35 | 5 |
| 60 | 55 | 55 |
| 69 | 65 | 65 |
| 71 | 5 | 15 |

| 111 | RPP ID 401(1) | Time range 402(1) t=10-30 |
| --- | --- | --- |
| 112 | RPP ID 401(2) | Time range 402(2) t=40-50 |
| 113 | RPP ID 401(3) | Time range 402(3) t=20-70 |

SNAPSHOT RESTORE

TECHNICAL FIELD

The present disclosure generally relates to the field of data storage, and more particularly to retrieving a file system entity at a presence of snapshot restore in the history of the file system entity.

BACKGROUND

Snapshots capture an image of a file system or a portion of the filesystem (e.g., a file or a directory) at a particular point in time. After a snapshot is taken, the system continues writing new data to the working version, while preserving the ability to access data that was stored at the time when the snapshot was taken.

Snapshots are deployed by backup applications and replication services, and served for disaster recovery purposes.

Recovering from data corruption can be handled by reverting the working version to an older version by restoring an older snapshot over the working version.

There is a need for a fast restore of an older version without losing any of the updates made by newer versions.

SUMMARY

There may be provide a storage system, a method and a non-transitory computer readable medium for retrieving a file system entity at a presence of snapshot restore in the history of the file system entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example of contents being used for responding to requests related to different times;

FIG. 4 is an example of a blind period of time registry;

DETAILED DESCRIPTION

Figure 1:
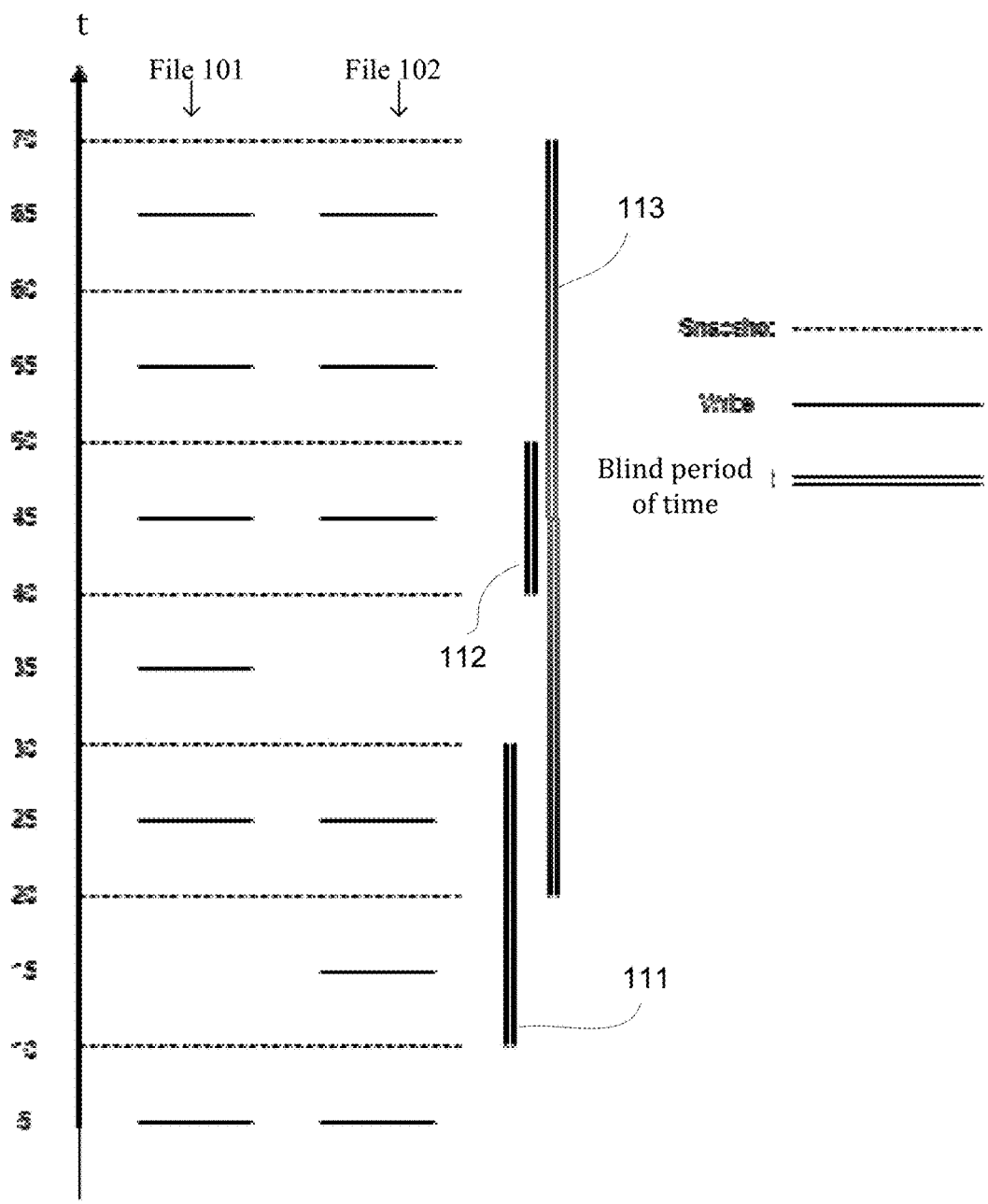
FIG. 1 is an example of a timeline diagram of writes and snapshots.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods, and non-transitory computer readable medium for retrieving a file system entity at a presence of snapshot restore in the history of the file system entity.

The restore process described herein enables restoring a filesystem tree or a portion thereof, back to its state as was captured by an earlier snapshot, instantaneously. The restoring is cancelable and can be undone instantaneously. The restoring does not prevent the ability to access any bypassed version between the restored snapshot and the current version.

Each piece of data stored in the system is associated with metadata that includes a timestamp indicating the time when the content was written. There may exist multiple contents associated with a certain offset that were written at different times. When the content in the certain offset and of a certain version/time is requested to be read, the content that was written at the time that is closest to the time of the requested version (i.e., its timestamp is equal to or smaller than the time of the requested version) is selected as having the content needed to be read.

The timestamps are assigned to the written data by utilizing time values of a global system clock that is consistent across all compute nodes of the storage system. The global clock may be a counter that is incremented periodically and is saved in one or more storage nodes that are accessible to all the compute nodes.

The snapshot restore process, for restoring a filesystem path with a previous snapshot, creates a blind period of time that includes a time range that needs to be ignored when selecting the relevant content for responding to future accesses to data that is part of the restored filesystem path.

The system handles a blind period of time registry that includes multiple blind periods of time for different filesystem paths (also referred to as protected paths). There may be multiple blind periods of time per each protected path, in case where multiple different restores took place for this path, at different times. Each blind period of time entry in the registry includes: a protected path identifier and a time range to be ignored.

The protected path refers to a sub-tree (or the whole tree) that is associated with a snapshot schedule or with one or more snapshots taken regardless of the snapshot schedule (e.g., manually). The snapshot schedule may be defined by the user and includes time policies (e.g., a rate of periodic snapshotting) for taking snapshots and for deleting old snapshots. The protected path includes a top directory and all the descendant directories of the top directory, including all files or other objects in any of the directories along the protected path.

Suppose that at a certain point in time, e.g., t6, a user requests to restore a snapshot of a certain time (referred to as the restored time), e.g., the snapshot that was taken at t3, that is associated with a certain protected path—the following restore process takes place for restoring snapshot t3 over the current version of t6. A snapshot is taken for the protected path, so as to capture the state at the current time, i.e., the time when the restore enters into force, e.g., t6. The system clock is advanced whenever a snapshot is taken, so that subsequent write requests will be associated with the next snapshot, and that any subsequent read or write request will take the newly created blind period of time into account. In this example, the system clock is advanced to t7.

In order to enforce the restore, a blind period of time is created for the protected path, so as to identify the time range whose content should be ignored, when files or directories that belong to the protected path are accessed, upon certain circumstances that will be detailed hereinafter. In this example, the blind period of time information includes the identity of the protected path and the time range that starts at t3, the time of the restored snapshot, and ends at t6, the time when the restore enters into force.

An access request may be received for accessing a certain filesystem entity (file, directory, or other object) that is part of a protected path that experienced a restore. The access request may further address a certain version (time) requested to be read or may refer to the current time, as a default. In response to the access request, the blind period of time registry is checked to figure out whether there are one or more blind periods of time that are relevant for the access operation, given the requested version. From among all the blind periods of time that exist for the protected path of the accessed filesystem entity and whose end-time is earlier than the requested version, the blind period of time having the newest (maximal) end-time from among blind periods of time having an end-time that is earlier than the time of the requested version to be read—is considered as a first relevant blind period of time that covers a range whose content is to be ignored. In the above example, the blind period of time that covers the range t3-t6 is a first relevant blind period of time.

There may be older blind periods of time that may be relevant and need to be checked. The process is repeated for additional blind periods of time that do not overlap with the first relevant blind period of time. The second iteration of the process for finding relevant blind periods of time looks up for blind periods of time whose end-time is earlier than the start time of the previously found relevant blind period of time, e.g., earlier than t3. The one whose end-time is the closest to the start time of the first relevant blind period of time (and earlier) is selected as a second relevant blind period of time. The process continues to find other blind periods of time, in the same manner.

Responding to the access request includes ignoring any content that is associated with a time that falls within any of the relevant blind periods of time. The selected content to be read is the content associated with the newest time among contents that are associated with a timestamp that is equal to or earlier than the requested version, and that is not included in the ranges of any of the relevant blind periods of time.

FIG. 1 illustrates a timeline diagram of writes and snapshots along time t, where the system clock ticks every 5 time-units. Offsets within two files, file 101 (the left column) and file 102 (the right column) are illustrated, where the writes to these offsets are illustrated as horizontal solid lines. For example, writes were performed to a first offset of file 101 at t=5, 25, 35, 45, 55 and 65, and writes to a second offset of file 102 were performed at t=5, 15, 25, 45, 55 and 65. The snapshots taken are illustrated as horizonal dotted lines. In this example, the snapshots were taken at t=10 to 70, every 10 time-units.

Blind periods of time are illustrated as vertical double lines. Three blind periods of time (111, 112, 113) are illustrated to cover time ranges: 10-30, 40-50, and 20-70. The three blind periods of time were created in response to three restore requests: at t=30, a restore was requested for restoring the snapshot of t=10 over the working (current) version that existed on t=30; at t=50, a restore was requested for restoring the snapshot of t=40 over the working version that existed on t=50; and at t=70, a restore was requested for restoring the snapshot of t=20 over the working version that existed on t=70. Note that blind period of time 113 causes blind periods of time 111 and 112 to be irrelevant when accessing versions above t=70, because the restoring that created blind period of time 113 reverted the content to t=20, which is before the time when the other two restores occurred. Blind periods of time 111 and 112 are relevant when accessing versions below t=70 (or if the restore at t=70 will be undone). Therefore, it can be determined that when two or more blind periods of time overlap, the one whose end-time that is closest (from below) to the requested version is the only relevant blind period of time among them.

The snapshots at the top of each blind period of time (snapshots of t=30, 50 and 70) are the snapshots created by the triggering of the restore operation. Other snapshots may be user created snapshots, either scheduled or manual snapshots.

Access requests at different times and access requests that address different versions take different sets of blind periods of time into account. For example, access requests between times 50 and 69 (or later access requests that address versions in this time range) should consider blind periods of time 111 and 112, which are two non-overlapping blind periods of time that ended before the time of the request. However, for accesses at times 51-54 towards file 101, there is content that was written at time 35, i.e., a time between the two blind periods of time, that is not covered by any relevant blind period of time 111 or 112. For accesses at times 51-54 towards file 102, there is no content that was written between the blind periods of time, and therefore a content that was written earlier than both blind periods of time needs to be accessed. Following are more detailed examples.

Example 1: access requests to access files 101 and 102, that were received at t=20, or received at a later time but the request specifies that the version of t=20 is requested, will be responded with offsets that were written at t=5 for file 101, and t=15 for file 102. No blind periods of time are to be considered, since no restore was in force at this time. Note that the content at t=5 was selected for accessing file 101, since this is the newest content that precedes the request time.

Example 2: access requests to access files 101 and 102, that were received at t=40, or received at a later time but the request specifies that the version of t=40 is requested, will be responded with contents that were written at t=35 for file 101, and t=5 for file 102. In this case, there is a relevant blind period of time that is considered that covers time range 10-30. Since file 101 was written to after the restore, at t=35, the blind period of time does not influence the response, since t=35 is not covered by the time range of the blind period of time, and data that was written at t=35 is relevant. As for file 102, the file was written at times 5, 15 and 25, but t=15 and 25 are to be ignored since they are covered by blind period of time 111, which is the relevant blind period of time for this access. Therefore, the access request is responded with the content written at t=5.

Example 3: access requests to access files 101 and 102, that were received at t=47, or received at a later time (e.g., t=60) but the request specifies that the version of t=47 is requested, will be responded with contents that were written at t=45 for both files, since t=47 is earlier than the restore that was performed at t=50 and created the blind period of time that covers t=40-50, which is not a relevant blind period of time for an access requests related to t=47.

Example 4: access requests to access files 101 and 102, that were received at t=51, or received at a later time but the request specifies that the version of t=51 is requested, the relevant blind periods of time are 111 and 112 that covers time ranges 10-30 and 40-50. For file 101, the request will be responded with the offset written at t=35, since it is the newest content that is out of the scope of any blind period of time. As for file 102, blind periods of time 111 and 112 filters out any content that was written at t=45, 25 and 15. Therefore, the request is responded with the content of t=5.

The determination of the relevant blind periods of time in example 4 includes two iterations. the first iteration includes searching for a blind period of time that corresponds to the protected path that includes file 102, whose end time is smaller and closest to t=51 addressed by the request. The first iteration determines that blind period of time 112 is relevant. The second iteration includes searching for an additional blind period of time whose end-time is smaller than the start time (t=40) of the blind period of time that was found in the previous iteration, 112. The first iteration determines that blind period of time 111 is relevant, since its end time is 30, which is smaller than 40.

Example 5: access requests to access files 101 and 102, that were received at t=67, or received at a later time but the request specifies that the version of t=67 is requested, are both responded with the content of t=65, since it was written after the end of the closest blind period of time 112 that ended at t=50, and blind period of time 113 is not relevant since it relates to a restore that occur at t=70, i.e., after t=67.

Example 6: access requests to access files 101 and 102, that were received at t=71, or received at a later time but the request specifies that the version of t=71 is requested, the relevant blind period of time is 113 that filters out any content that was written at t=20-70. There are no more relevant blind periods of time, since blind periods of time 111 and 112 overlap with blind period of time 113, or in other words—there is no other blind period of time whose end-time is earlier than the start time t=20 of blind period of time 113 (blind period of time 111 ends at t=30 which is later than the start time t=20 of blind period of time 113). Therefore, the requests are responded with contents that were written at t=5 and 15, respectively.

Table 200 of FIG. 2 summarizes the contents being used for responding to requests related to different times.

The restoring does not cause the deletion of bypassed snapshots, and therefore the restore can be undone. For example, the user may request to restore snapshot of t=30, check the version, regret, and undo the restore (which will cause reverting to the latest version of t=70), and again—restore snapshot of t=50, check the version, undo, etc. Undoing a restore includes deletion of the blind period of time associated with the restore, i.e., the blind period of time having a start time that equals the time associated with the restored snapshot.

Blind periods of time can be deleted when all the snapshots in the time range of the blind period of time are deleted.

Furthermore, any snapshot, even those that are covered by blind periods of time are still accessible, as was described in the above examples.

In order to facilitate a fast restore and a fast response to access requests that are part of a protected path that was restored, the user of the storage system may be able to define protected paths as restorable, i.e., may be restored in the future. Upon receiving a request to define a protected path as a restorable protected path, a tagging process will create a unique identifier for the restorable protected path, and will tag any file system entity (file, directory) that is part of the protected path, with the created identifier.

When a restore is performed for the restorable protected path the blind period of time is created with the identifier of the restorable protected path and the relevant time range.

When an access is performed to a filesystem entity, it is determined whether the filesystem entity is tagged with an identifier of a restorable protected path. If so—the blind period of time registry is checked for relevant blind periods of time related to the restorable protected path.

Figure 3:
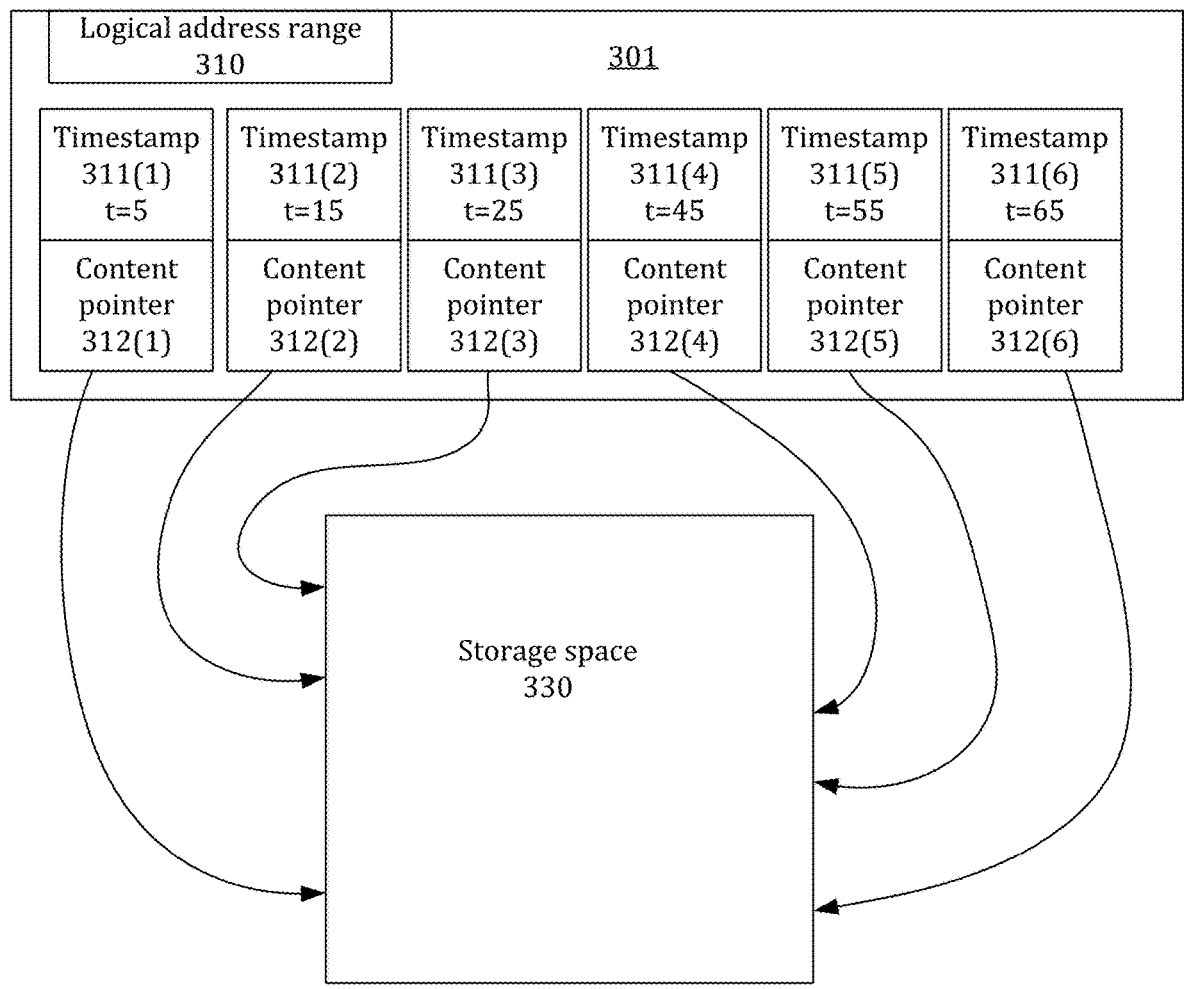
FIG. 3 is an example of a mapping entry.

FIG. 3 illustrates a mapping entry 301, which may be part (one entry of multiple entries) of a mapping data structure that maps logical addresses (offsets) within a file, e.g., file 102, into addresses of the stored data. Mapping entry 301 maps a specific logical address range 310 (offset with the file, extent) into multiple contents that were written to logical address range 310 of the file at different times. Each version element within the mapping entry includes a timestamp 311 of the time when the content, pointed by pointer 312, was written. In this example, there are six versions of the content in address range 310 that correspond to the write times illustrated in FIG. 1 : a first version includes timestamp 311(1) that has the value t5 and a content pointer 312(1) that points to a data extent stored in a storage space 330 of the storage system; a sixth version includes timestamp 311(6) that has the value t65 and a content pointer 312(6) that points to another data extent stored in a storage space 330 of the storage system; etc. A file may be associated with multiple mapping entries, for all of its extents, that are part of a mapping data structure of the entire file.

When a filesystem entity, e.g., file 102, is accessed, and it is determined that the file is part of a restorable protected path, the blind period of time registry 400 of FIG. 4 is looked up for relevant blind periods of time.

Blind period of time registry 400 is illustrated as including the three blind periods of time 111-113 of FIG. 1, although the blind period of time registry may include blind periods of time of different restorable protected path other than the protected path described in FIG. 1. Each blind period of time includes: (i) a RPP (restorable protected path) identifier, such as RPP ID 401(1)-401(3); and time range 402, such as time range 402(1) that covers time range t10-t30, time range 402(2) that covers time range t40-t50, and time range 402(3) that covers time range t20-t70.

Referring back to FIG. 3, suppose the access request to address range 310 of file 102 is addressed to version t=71. The lookup of blind period of time registry 400 detects that there is only one relevant blind period of time 113 that covers time range 20-70. Among the six versions found in the corresponding mapping entry 301, only the versions of t=5 and t=15 are not masked by the blind point 113. The version of t=15 is selected for responding to the access request, since it is the newest version that is closest to the requested version, and not masked by the relevant blind period of time.

Figure 5:
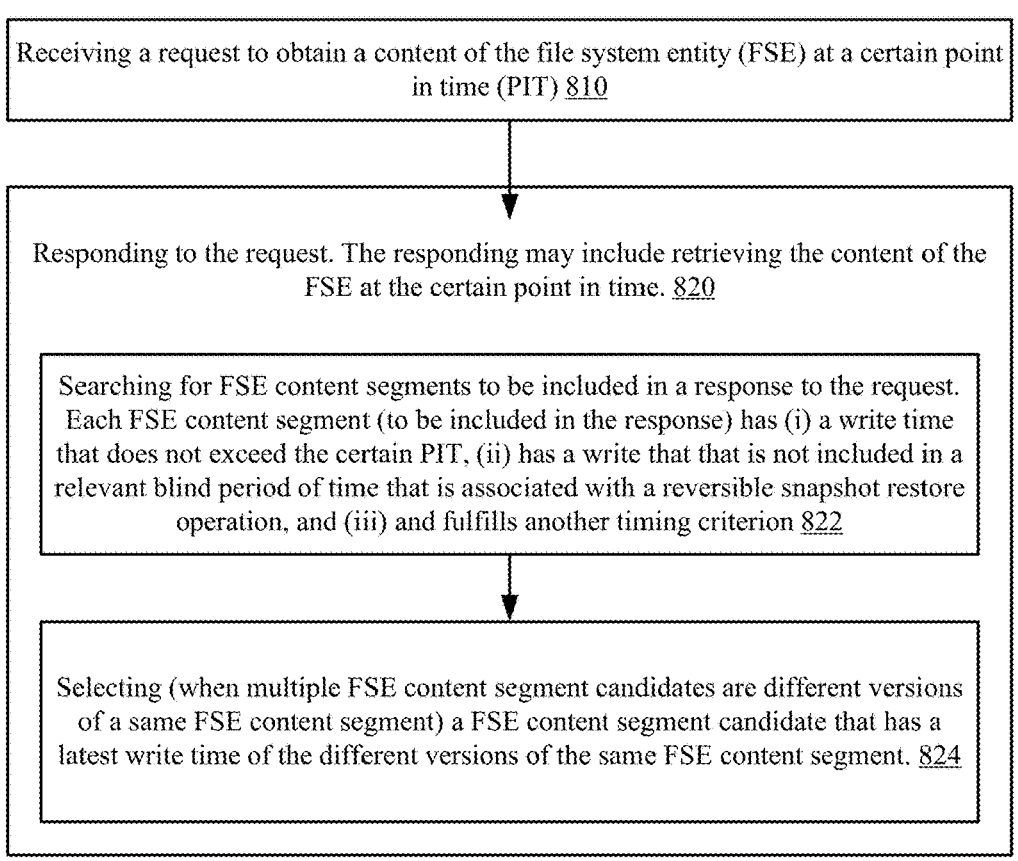
FIG. 5 is an example of a method.

FIG. 5 illustrates an example of method 800 for retrieving a file system entity at a presence of snapshot restore in a history of the file system entity.

Method 800 may start by step 810 of receiving a request to obtain a content of the file system entity (FSE) at a certain point in time (PIT).

Step 810 may be followed by step 820 of responding to the request. The responding may include retrieving the content of the FSE at the certain point in time. Step 820 may also include sending the content of the FSE at the certain point in time—the sending may be to the requesting entity.

Step 820 includes step 822 of searching for FSE content segments to be included in a response to the request. Each FSE content segment (to be included in the response) has (i) a write time that does not exceed the certain PIT, (ii) has a write time that that is not included in a relevant blind period of time that is associated with a reversible snapshot restore operation, and (iii) and fulfills another timing criterion—for example being a most relevant FSE content segment. The timing criterion may be an additional requirement on the write times of the searched FSE content segments. An example of most relevant FSE content segment is described on step 824.

The relevant blind period of time is defined by timing limits of the reversible snapshot revert operation, such as a time range 402 of FIG. 4.

There may be more than one relevant blind periods of time per the same content segment.

For example—assuming that the reversible snapshot restore operation includes reverting a content of a first PIT to a content of a snapshot at second PIT that preceded the first PIT, and wherein the blind period of time spans between the second PIT and the first PIT. The first PIT may be the current time or may be a past time, for example, a time of a writable clone. Under this assumption—a relevant blind period of time has to end before the certain PIT. For example—referring to FIG. 1, and assuming that the certain PIT is 51—then blind period of time 113 is irrelevant as it ends after PIT 51. Blind periods of times 111 and 112 may be relevant blind periods of time.

Referring back to FIG. 5—step 820 may include step 822 of searching for FSE content segments candidates. Each FSE content segment candidate has a write time that does not exceed the certain PIT, and is not included in the relevant blind period of time that is associated with the reversible snapshot restore operation.

Step 820 may also include step 824 (following step 822) of selecting (when multiple FSE content segment candidates are different versions of a same FSE content segment) a FSE content segment candidate that has a latest write time of the different versions of the same FSE content segment.

If only a single version of a content segment exists and is not located within a relevant blind period of time—it may be part of the response.

If, for example, two PIT relevant blind periods of times (that end before the certain PIT) partially overlap—than the latest (having the latest end point) blind period of time of the partially overlapping blind periods of time is deemed the relevant blind period of time—and the other (partially overlapping) blind periods (or period) of time are deemed to be irrelevant.

Figure 6:
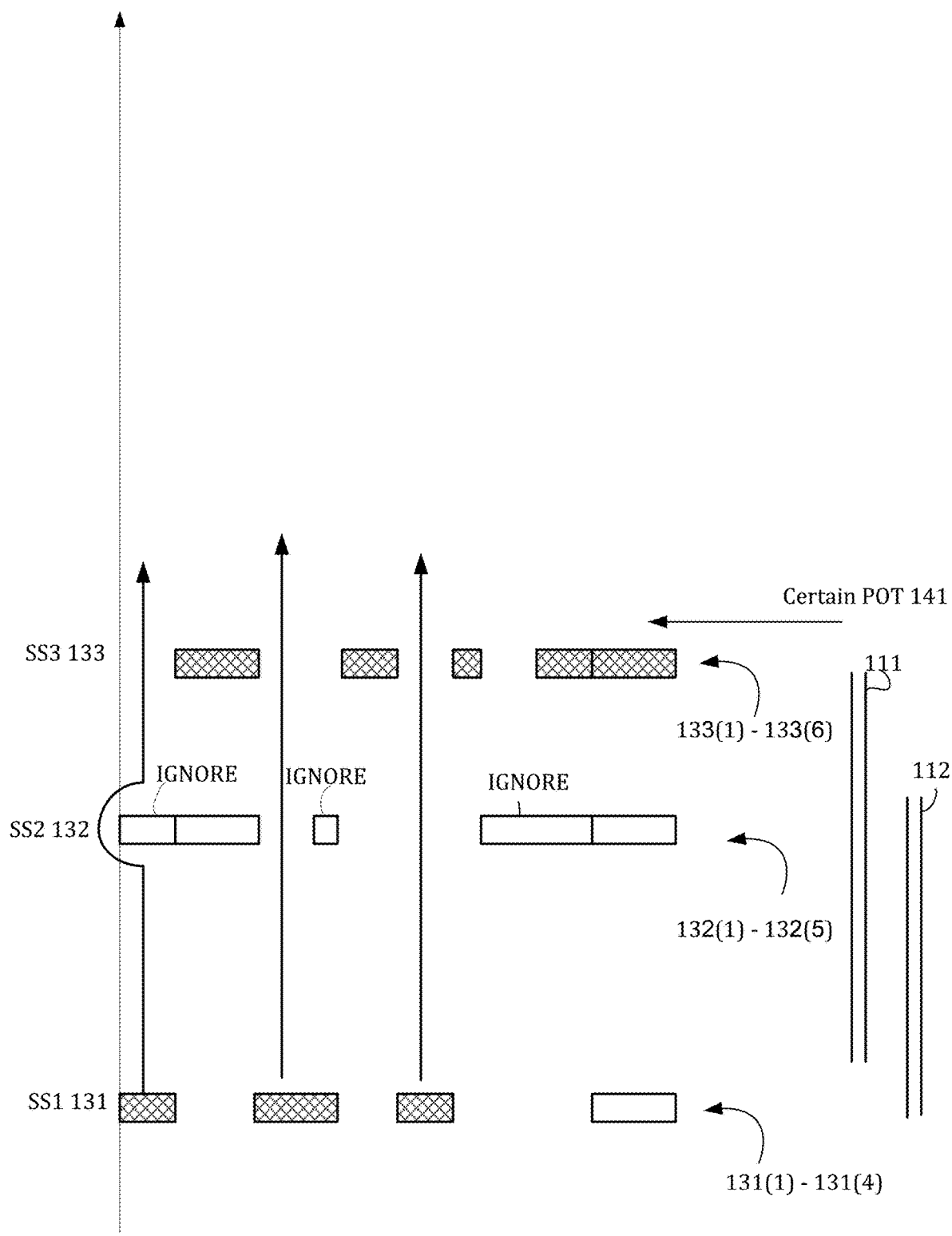
FIG. 6 is an example of a timeline diagram of writes and snapshots.

FIG. 6 illustrates an example of a timeline diagram of three snapshots—SS1 131, SS2 132 and SS3 133 and two blind periods of time 111 and 112 that partially overlap.

The certain PIT 141 exceeds the ends of blind periods of time 112 and 111—but the blind period of time 111 has a later end point—so that blind period of time 112 is relevant and blind period of time 111 is irrelevant.

SS1 131 includes four snapshot segments 131(1)-131(4) for four content segments at different offsets that were written to the filesystem entity at the time covered by SS1 131, SS2 132 includes five snapshot segments 132(1)-132(5), and SS3 133 includes five snapshot segments 133(1)-133(5).

Snapshot segments 131(1) and 132(1) are different versions of the same segment, as they were written to the same location (address range, offset) at different times.

Snapshot segments 132(2) and 133(1) are different versions of the same segments.

Snapshot segment 132(3) and a part of snapshot segment 131(2) are different versions of the same segment.

Part of snapshot segment 132(4) and snapshot segment 133(4) are different versions of the same segment.

Snapshot segments 131(4), 132(5) and 133(5) are different versions of the same segment. Snapshot segments 131(4) and 133(5) can be regarded as FSE content segments candidates and snapshot segment 133(5) is selected—being the later snapshot segment.

As indicated above—SS2 falls within the relevant blind period of time 111—and thus its snapshot segments 131(1)-131(4) should be ignored (and not included in the response)—even when an SS2 segment is the latest version of a same segment (out of SS1-SS3).

Figure 7:
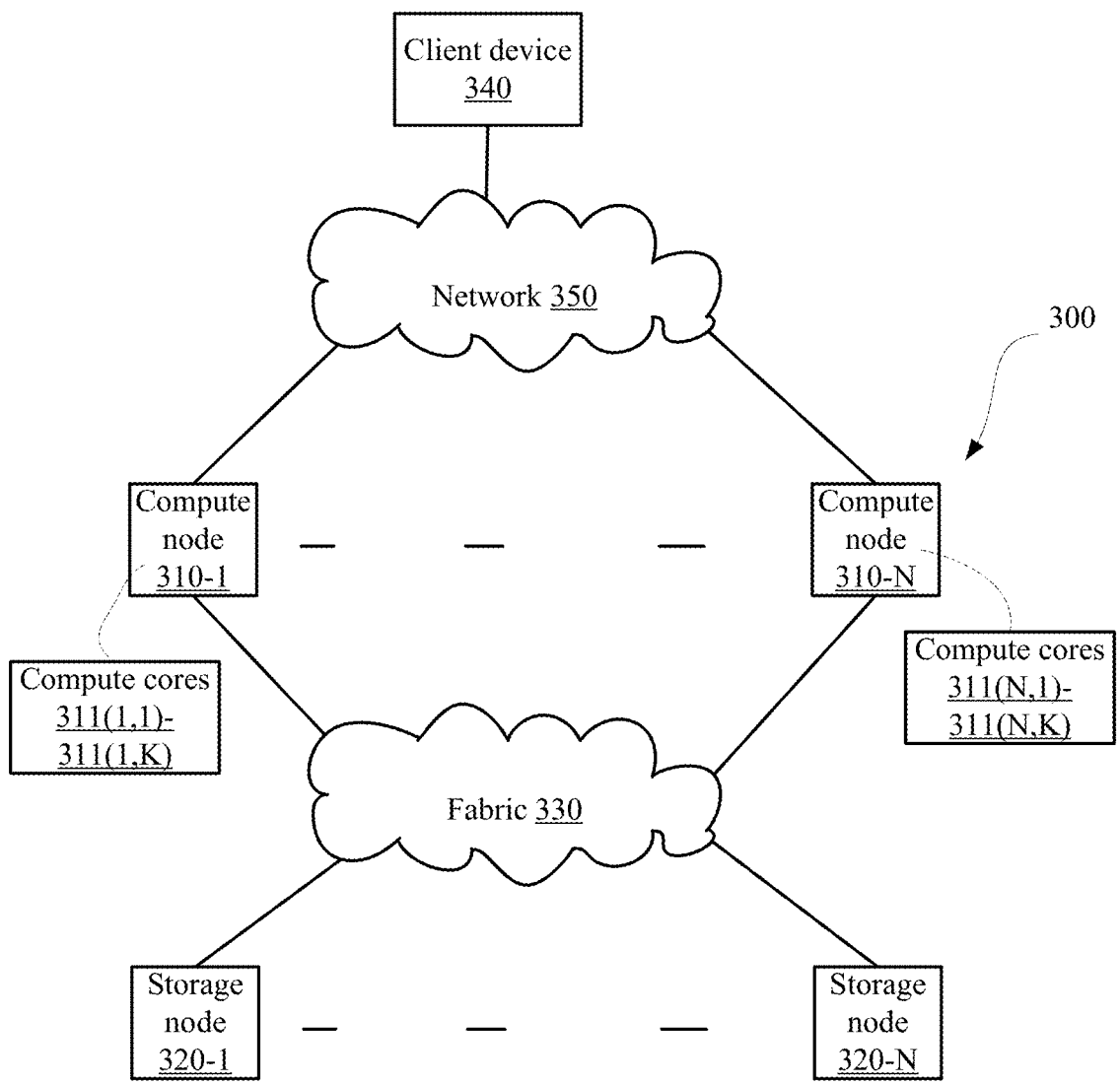
FIG. 7 is an example of a storage system.

FIG. 7 shows an example diagram of a storage system 300 according to the disclosed embodiments.

The storage system 300 includes a number of N compute nodes 310-1 through 310-N (hereinafter referred to individually as a compute node 310 and collectively as compute nodes 310, merely for simplicity purposes, N is an integer equal to or greater than 1). The compute nodes include (or may execute) multiple compute cores each (for example

311(1,1)-311(1,K) of compute node 310-1 and 311(N,1)-311 (N,K) of compute node 310-N).

The storage system 300 also includes a number of M storage nodes 320-1 through 320-M (hereinafter referred to individually as a storage node 320 and collectively as storage nodes 320, merely for simplicity purposes, M is an integer equal to or greater than 1). The computer nodes 310 and the storage nodes 320 are connected through a communication fabric 330. M may equal N or may differ from N.

In an embodiment, a compute node 310 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 310 does not require any dedicated hardware.

A compute node 310 is configured to perform tasks related to the management of the storage nodes 320 and to store data related to segment contents and snapshots in the storage nodes 320. In an embodiment, each compute node 310 may interface one or more client devices (such as client device 340). The compute nodes may receive from the client devices (requesting entities) commands, such as requests for snapshot restore, snapshot schedule definition, protected paths definitions, and access requests related to filesystem entities. The compute nodes interface the clients via one or more networks, such as network 350. The network may be, but is not limited to, the Internet, the world-wide-web (WWW), a local area network (LAN), a wide area network (WAN), and the like.

A compute node 380 or any compute core may execute method 800.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for retrieving a file system entity at a presence of snapshot restore in a history of the file system entity, the method comprises:
   receiving a request to obtain a content of the file system entity (FSE) at a certain point in time (PIT); and
   retrieving the content of the FSE at the certain point in time, wherein the retrieving comprises searching for FSE content segments to be included in a response to the request, wherein each FSE content segment has a write time that does not exceed the certain PIT, each FSE content segment is not included in a relevant blind period of time that is associated with a reversible snapshot restore operation, and fulfills another timing criterion, wherein the relevant blind period of time is defined by timing limits of the reversible snapshot restore operation, and wherein the reversible snapshot restore operation comprises reverting a content of a first PIT to a content of a snapshot at second PIT that preceded the first PIT, and wherein the relevant blind period of time spans between the second PIT and the first PIT.

2. The method according to claim 1 wherein the relevant blind period of time ends before the certain PIT.

3. The method according to claim 1 wherein the relevant blind period of time has a latest ending time out of partially overlapping blind periods of ending time that ends before the certain PIT.

4. The method according to claim 1 wherein the searching comprises searching for FSE content segments candidates, wherein each FSE content segment candidate has a write time that does not exceed the certain PIT, and is not included in the relevant blind period of time that is associated with the reversible snapshot restore operation.

5. The method according to claim 4 wherein when multiple FSE content segment candidates are different versions of a same FSE content segment then selecting a FSE content segment candidate that has a latest write time of the different versions of the same FSE content segment.

6. A non-transitory computer readable medium for retrieving a file system entity at a presence of snapshot restore in a history of the file system entity, the non-transitory computer readable medium stores instructions for:
   receiving a request to obtain a content of the file system entity (FSE) at a certain point in time (PIT);
   retrieving the content of the FSE at the certain point in time, wherein the retrieving comprises searching for FSE content segments to be included in a response to the request, wherein each FSE content segment has a write time that does not exceed the certain PIT, each FSE content segment is not included in a relevant blind period of time that is associated with a reversible snapshot restore operation, and fulfills another timing criterion, wherein the relevant blind period of time is defined by timing limits of the reversible snapshot restore operation, and wherein the reversible snapshot restore operation comprises reverting a content of a first PIT to a content of a snapshot at second PIT that preceded the first PIT, and wherein the relevant blind period of time spans between the second PIT and the first PIT.

7. The non-transitory computer readable medium according to claim 6, wherein the relevant blind period of time ends before the certain PIT.

8. The non-transitory computer readable medium according to claim 6, wherein the relevant blind period of time has a latest ending time out of partially overlapping blind periods of ending time that ends before the certain PIT.

9. The non-transitory computer readable medium according to claim 6, wherein the searching comprises searching for FSE content segments candidates, wherein each FSE content segment candidate has a write time that does not exceed the certain PIT, and is not included in the relevant blind period of time that is associated with the reversible snapshot restore operation.

10. The non-transitory computer readable medium according to claim 9, wherein when multiple FSE content segment candidates are different versions of a same FSE content segment then selecting a FSE content segment candidate that has a latest write time of the different versions of the same FSE content segment.

11. A storage system having file system entity retrieval capabilities at a presence of snapshot restore in a history of the file system entity, the storage system comprises one or more storage nodes, configured to store snapshots of the file system entity, and one or more processing circuitries that are configured to:
   receive a request to obtain a content of the file system entity (FSE) at a certain point in time (PIT); and
   retrieve the content of the FSE at the certain point in time, wherein the retrieving comprises searching for FSE content segments to be included in a response to the request, wherein each FSE content segment has a write time that does not exceed the certain PIT, each FSE content segment is not included in a relevant blind period of time that is associated with a reversible snapshot restore operation, and fulfills another timing criterion, wherein the relevant blind period of time is defined by timing limits of the reversible snapshot restore operation, and wherein the reversible snapshot restore operation comprises reverting a content of a first PIT to a content of a snapshot at second PIT that preceded the first PIT, and wherein the relevant blind period of time spans between the second PIT and the first PIT.

* * * * *